(12) United States Patent
Augst (10) Patent No.: US 10,513,218 B2
(45) Date of Patent: *Dec. 24, 2019

(54) METHOD FOR DIRECTION-ADAPTIVE SIGNALING

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 47 days.

This patent is subject to a terminal disclaimer.

(21) Appl. No.: 14/693,353

(22) Filed: Apr. 22, 2015

(65) Prior Publication Data

US 2015/0232018 A1 Aug. 20, 2015

Related U.S. Application Data

(63) Continuation of application No. PCT/EP2013/071679, filed on Oct. 17, 2013.

(30) Foreign Application Priority Data

Oct. 25, 2012 (DE) .................. 10 2012 219 574

(51) Int. Cl.
  *B60Q 1/26* (2006.01)
  *G09F 19/14* (2006.01)
  *G09F 19/18* (2006.01)
  *G09F 21/04* (2006.01)

(52) U.S. Cl.
  CPC ............... *B60Q 1/26* (2013.01); *G09F 19/14* (2013.01); *G09F 19/18* (2013.01); *G09F 21/04* (2013.01)

(58) Field of Classification Search
  CPC ......... B60Q 1/2619; B60Q 1/50; G09F 19/14; G09F 19/18; G09F 21/04
  USPC ........................................................ 340/468
  See application file for complete search history.

(56) References Cited

U.S. PATENT DOCUMENTS 6,133,851 A * 10/2000 Johnson .................. B60Q 1/30
  340/431
7,020,992 B1 * 4/2006 Christie .................. G09F 21/04
  40/593
2003/0025597 A1 * 2/2003 Schofield ............... B60Q 1/346
  340/435

(Continued)

FOREIGN PATENT DOCUMENTS

DE       199 33 660 A1   1/2001
DE  10 2006 050 546 A1   4/2008

(Continued)

OTHER PUBLICATIONS

International Search Report (PCT/ISA/210) dated Dec. 16, 2013, with English translation (six (6) pages).

(Continued)

*Primary Examiner* — Steven Lim
*Assistant Examiner* — Mancil Littlejohn, Jr.
(74) *Attorney, Agent, or Firm* — Crowell & Moring LLP (57) ABSTRACT

A method is provided for direction-adaptive signaling, particularly by a vehicle. The method displays a graphical message, wherein the graphical message is visible from outside the vehicle and is visible essentially only from one spatial angle. At least one angle parameter of the spatial angle is altered during display of the graphical message.

19 Claims, 3 Drawing Sheets

(56) References Cited

U.S. PATENT DOCUMENTS

| | | | | |
|---|---|---|---|---|
| 2005/0251461 A1* | 11/2005 | Nykamp | ............ | G06Q 30/0603 |
| | | | | 705/26.41 |
| 2006/0055678 A1* | 3/2006 | Kleihorst | ............... | G02B 27/06 |
| | | | | 345/173 |
| 2010/0275266 A1* | 10/2010 | Jakobson | .................. | G06F 3/14 |
| | | | | 726/26 |
| 2011/0310232 A1* | 12/2011 | Wilson | ................... | G09G 3/003 |
| | | | | 348/51 |
| 2012/0062372 A1 | 3/2012 | Augst | | |

FOREIGN PATENT DOCUMENTS

| | | | | |
|---|---|---|---|---|
| DE | 10 2006 050 547 A1 | 4/2008 | | |
| DE | 10 2006 050 548 A1 | 4/2008 | | |
| DE | 10 2008 061 747 A1 | 6/2009 | | |
| DE | 10 2008 051 591 A1 | 4/2010 | | |
| DE | 10 2008 051 593 A1 | 4/2010 | | |
| DE | 10 2009 020 328 A1 | 11/2010 | | |
| EP | 1 334 871 A2 | 8/2003 | | |
| FR | 2 949 725 A1 | 3/2011 | | |
| GB | 2468896 A | 9/2010 | | |
| WO | WO 2011/090417 A1 | 7/2011 | | |
| WO | WO 2011090417 A1 * | 7/2011 | ............. | B60Q 1/525 |
| WO | WO-2011090417 A1 * | 7/2011 | ............. | B60Q 1/525 |
| WO | WO 2013/012360 A1 | 1/2013 | | |

OTHER PUBLICATIONS

German Search Report dated Sep. 27, 2013, with partial English translation (ten (10) pages).

* cited by examiner

METHOD FOR DIRECTION-ADAPTIVE SIGNALING

CROSS REFERENCE TO RELATED APPLICATIONS

This application is a continuation of PCT International Application No. PCT/EP2013/071679, filed Oct. 17, 2013, which claims priority under 35 U.S.C. § 119 from German Patent Application No. 10 2012 219 574.2, filed Oct. 25, 2012, the entire disclosures of which are herein expressly incorporated by reference.

This application contains subject matter related to U.S. application Ser. No. 14/692,885, entitled "Method for Direction Dependent Signaling" filed on Apr. 22, 2015.

BACKGROUND AND SUMMARY OF THE INVENTION

The invention relates to a method for direction-adaptive signaling, particularly by a vehicle, and to an apparatus for the same purpose.

Today, the opportunities for visual communication among road users on the basis of technical tools are limited. Such technical tools essentially include the use of turn signals and the high beam.

Occasionally, special vehicles or emergency vehicles have ordinary display panels that are able to present short texts or symbols such as "please follow".

The problem addressed herein is to improve the technical tools that can be used to transmit messages purposefully to other road users.

The problem is solved by a method for direction-dependent signaling particularly by a vehicle, as well as an apparatus for the same purpose.

In one aspect, a method for direction-adaptive signaling, particularly by a vehicle, includes: display of a graphical message, wherein the graphical message is visible from outside the vehicle and is visible essentially only from one spatial angle, alteration of at least one angle parameter of the spatial angle during operation. At least one parameter of the spatial angle can be altered while the graphical message is visible to the observer or while the graphical message is displayed. By way of example, at least one angle parameter is altered while the graphical message is displayed, e.g. in a short interval between two frames.

In this way, another road user (other drivers, pedestrians, cyclists) can be shown a graphical message intended specifically for him (vehicle signals, symbols) when looking at the vehicle. Every road user can have a graphical message displayed to him that is tailored to him, without further road users being able to perceive the graphical message. This allows misunderstandings to be avoided, and road users who are not involved can be protected from overexcitement as a result of information that is not relevant to them. Even in the case of automatically prompted full braking, for example, it is thus possible for the vehicle to display a signal in timely fashion specifically in the direction of another road user in order to minimize possible consequences of this action. No side effects arise for other road users. The further road users are not distracted by graphical messages that are not intended for them and are also not liable to interpret a graphical message incorrectly, since they do not see it.

At the same time, the method allows the graphical message to be tracked. In most situations, road users move relative to one another. During this, the case may arise that the road user looking at the graphical message moves out of the spatial angle at which the graphical message is displayed to him. On the basis of the method disclosed, it is now possible to track the display of the graphical message, so that the road user for whom the graphical message is intended can actually perceive it. At the same time, tracking allows the selection of a smaller spatial angle, that is to say a smaller region from which the graphical message is visible. Therefore, fewer road users who are not involved are also irritated or misled by the graphical message. The method can be performed as an alternative or in addition to the legally required display means such as lamps or turn signals. In particular, at least one graphical message is visible from outside when looking at the vehicle surface, particularly at a region of the vehicle that is non-transparent per se, directly.

The alteration of the at least one angle parameter of the spatial angle may be embodied continuously, in particular almost continuously by way of angle stages of less than 5° or less than 10°, or discretely, e.g. in two or three steps, e.g. greater than 20°. In other words: the spatial angle can be changed continuously or in small barely perceptible stages while the method is being carried out. The alteration can also be made between the display of two successive frames, particularly such that two successive frames are altered so quickly that the observer does not notice an interruption in the display.

This means that a graphical message can be seen at a spatial angle of −20° to −35° relative to the longitudinal axis, for example, in surroundings and/or a traffic situation. When the traffic situation changes, the angles and/or other display parameters described above also change, so that the graphical message then becomes visible at the spatial angle of −5° to +30°, for example.

The spatial angle is determined using one or more angle parameters, these angles being the limits of the spatial angle. These can be, for example:

a) limiting angle clockwise $\varphi_1$,
b) limiting angle anticlockwise $\varphi_2$,
c) limiting angle upwards $\Theta_1$,
d) limiting angle downwards $\Theta_2$.

Alternatively, these can also be determined or described by way of a central angle, which denotes the orientation of an angle range, and/or an aperture angle that denotes the extent of the spatial angle, particularly a vertical, horizontal or radial aperture angle. A spatial angle therefore defines a region in space. The angles can be understood in a polar or spherical coordinate system, where the coordinate origin may be in a display, inside the vehicle behind the display or outside the vehicle and the display.

The graphical message can consist exclusively of text or also be made up of a sequence of graphical messages, the order of the graphical messages in the sequence illustrating logical, causal and/or spatial relationships, particularly with reference to the present traffic situation or arrangement of objects.

In one development, the alteration of the spatial angle is also embodied on the basis of one or more odometric parameters of the vehicle, particularly the speed of the vehicle, the present driving situation and/or execution of a particular type of driving maneuver. In this case, the driving situation may be an urban trip, a parking situation or being on motorways, for example. The types of maneuver may be merging onto an motorway or into a lane, an overtaking operation or a turning maneuver, for example. It is thus possible for the graphical message to be displayed for other stationary road users so as to be perceptible to them.

In another further development, the alteration of the spatial angle is also performed on the basis of a real and/or predicted movement by at least one road user, particularly such that the spatial angle is matched to the position of a road user and/or follows the movement of the road user. In an advantageous case, the alteration of the spatial angle takes account of the relative movement of the displaying vehicle in relation to the road user to whom the graphical message is intended to be displayed.

Hence, a graphical message can be displayed specifically just for one road user, so that it is displayed for him despite his relative movement in relation to the vehicle, particularly without perceptible interruptions. In this case, the road user can be captured using means, in particular sensors, in the vehicle, e.g. a camera, radar, lidar, etc., particularly using an object recognition method.

In a preferred embodiment of the invention, a graphical message, particularly an automatically generated warning, is displayed for a road user who is faced by the threat of a certain or likely collision with the vehicle. This is done without irritating further road users with this warning, sending a graphical message that is ambiguous for other road users or distracting said other road users.

In a further development, the spatial angle is determined on the basis of a position assumed and/or a maneuver executed by the vehicle, and/or the movement trajectory of the vehicle, within the recent past, particularly within the last 1, 2, 5, 10, 20, 30 seconds.

A movement trajectory may also include vehicle rotation, inclination or overturning.

Hence, the graphical message can be displayed specifically for road users for whom, particularly on account of the maneuver or the movement trajectory, said graphical message is particularly relevant. An informative graphical message can thus be displayed for a lateral region of the vehicle, said graphical message being useful when changing lane, on the basis of entry to an motorway in the recent past.

Display of a graphical message for a road user who is moving directly behind the vehicle is also particularly advantageous. In this case, a particular advantage is based on an increased risk of accident that could arise as a result of the vehicle braking and therefore on the vehicle possibly concealing the forward view of the road user in particular situations—e.g. during an overtaking operation.

A warning or informative graphical message can be signaled for a vehicle travelling behind, in particular directly following the ego vehicle in the case of an overtaking operation on a country road. The spatial angle alters in the individual phases of the overtaking operation so that a road user following behind can see a graphical message that is intended for him at least almost without interruption when looking at the vehicle, while the other road users are not disturbed, irritated or distracted by said graphical message.

In a further development, the alteration of the spatial angle is also based on two or more positions of the vehicle from the recent past. Advantageously, the spatial angle from which at least one, two or more graphical messages are visible is automatically adjusted on the basis of the earlier vehicle position, in particular no more than 1, 2, 3, 10, 20, 40 seconds ago. Hence, the graphical message is seen specifically from the direction of a vehicle that may be travelling behind, for example.

In this case, the vehicle positions can also be regarded as coordinates that have been ascertained by taking account of GPS coordinates from various instants from the recent past, for example, and/or as the vehicle orientation.

A particular advantage in this special case is that this requires no sensory detection of another road user, particularly one travelling directly behind (which sensory detection may not be available to the same extent in every vehicle). The graphical message can be displayed at a spatial angle from which specifically the conceivable recipient of this graphical message, or one that has a high probability of being present in a particular direction relative to the vehicle, is coming.

In another further development, the method includes the display of a second or further graphical message, particularly from the same vehicle region, wherein each graphical message has an associated spatial angle from which the respective graphical message is visible, but not the other graphical message(s); wherein the spatial angles differ at least in an angle parameter.

Hence, two or more graphical messages can be displayed, at least one of them altering its spatial angle, so that said graphical message automatically follows a road user, for example, while the other graphical message(s) is/are displayed only at a fixedly defined spatial angle, for example.

It is possible for two or more graphical messages to be displayed such that at least one angle parameter of at least two associated spatial angles is altered on the basis of the predetermined criteria.

It is possible for the same graphical message to be displayed at two spatial angles, with at least one angle parameter of at least one spatial angle being altered on the basis of the predetermined criteria.

In a variant, the associated spatial angles of at least two graphical messages differ only in an angle of elevation.

In particular, these may be at least two graphical messages, in particular displayed for the same reason. By way of example, a possible collision with a pedestrian can be displayed. The graphical messages can be displayed for spatial angles with different vertical angle parameters and can differ from one another in the geometric form, particularly in their proportions, in the symbols, and/or in an associated interval of time in which they are displayed.

In particular, a measured or estimated distance from a road user who is intended to see the display is also taken into account.

Hence, in the event of the threat of a collision with a pedestrian that is automatically identified using means in the vehicle, for example, it is possible for different types of graphical messages to be displayed: one for a child of small size and one for a distinctly larger adult. In the case of a child, the graphical message is displayed in accordance with the understanding and behavior of a child (e.g. in a symbol form that he can understand), while for the adult a text message is displayed, for example. The graphical messages can differ in the interval of time in which they are displayed, so that an adult person is provided with a much later warning graphical message than a child at the same distance from the vehicle. It is also possible for, by way of example, three or five different variants of a graphical message to be displayed, particularly at the same time or in quick alternation. The content of at least one graphical message can be redetermined continually, particularly on the basis of predetermined criteria.

In another example, a graphical message is displayed to a driver of a car travelling behind, while another or another form of graphical message is displayed to a driver of an HGV (commercial vehicle, for example) travelling further behind that is essentially in the same direction as the vehicle.

Hence, the method can display at least two different graphical messages to objects in different classes even without often costly and possibly error-prone sensory object classification.

In a further development, the one or more graphical messages include a symbol, text, a contour (particularly an object contour), one or more area(s) filled with one or more textures.

In a further development, the display is carried out using a display that includes microprisms, microlenses or lenticular optical elements.

An extremely simple and sufficiently effective implementation of the display consists in the use of TFT display technology together with a lenticular technology (flip image technology). This may be a prismatic or cylindrical optical film, for example, that steers the mapping of particular pixels in a different direction than the mapping of other particular pixels of the display. The actuation of particular pixels of the display can produce mapping for a particular direction (this is compiled from the pixel lights deflected in this direction), so that said mapping is perceived by different road users than essentially coherent graphics. Such a display apparatus may be fitted in a portion of the vehicle surface or visibly so as to shine through beneath the vehicle surface, for example. Alternatively, the display apparatus may be embodied as a projection (e.g. in a similar manner to a projector) that is fitted particularly behind a prismatic and/or cylindrical optical layer. The principle of presentation and direction dependence may be as described above in this case. What is particularly advantageous is such an embodiment in which the surface of the vehicle, which surface has the display apparatus fitted behind it, appears as an opaque surface from a particular direction when a graphical message is not currently being presented from that direction.

Two or more graphical messages can also be displayed with interruptions over time, in particular alternately, e.g. by turns, in succession.

Advantageously, the two or more graphical messages are produced at least to some extent by means of the same pixels or illuminants in this case. These are actuated for the one or other graphical message according to the order of the presentation.

In this case, the time intervals can be chosen such that the observer does not notice the rapid switching on and off of at least one graphical message. By way of example, it is thus possible for two observers from two directions each to see the graphical messages that are intended for them displayed constantly. This is comparable with the effect of video sequences, for example, which consist of frames or illumination of particular screen regions but are perceived by the observer as coherent rather than flashing, for example.

The graphical messages can be produced particularly by means of direction-dependent transmission of a particular quantity of light, the latter having different light values in many different directions, so that they are enough to provide the observer with an impression of a graphical message that is at the corresponding spatial angle. The optical properties of the beams that form a graphical message, e.g. in at least 500, 1000, 5000 different directions, assume different values at the same time or in a very short interval of time within the spatial angle.

The power, particularly the light output that the display apparatus transmits, may be below 100, 200, 400, 800 lm (lumens) on average during operation. This power alone may be sufficient to communicate the required information to other road users by means of graphical messages. This means that a very much lower power and low energy consumption is required than in the case of apparatuses that use selective illumination of the surroundings or signaling by way of illumination of surrounding objects, for example.

Alternatively or additionally, other technologies, particularly laser technologies, can be used in the display apparatus for producing graphical messages. By way of example, these can produce a pattern that is visible only from one direction, for example using the interference properties of coherent laser light and/or by using a mask that renders particular portions of the light shone in visible only from particular directions.

Alternatively or additionally, the method can be effected by means of, in particular locally different, influencing of light absorption or light refraction properties.

In a further development, the display of the graphical message includes the local alteration of the reflection properties, absorption properties and/or interference properties of the incident light, particularly the light that is incident from the direction of the spatial angle.

The method may be embodied such that the graphical message is produced by the influencing of light absorption or light diffraction properties. By way of example, the method may be embodied as a combination of an optical apparatus that influences the beam path on a location or angle specific basis and one or more elements that have light absorption properties, light reflection properties. In this case, the influencing of the light absorption properties, light reflection properties and/or interference properties may have local dependence on location. The graphical message that is displayed at a spatial angle forms as a pattern of light reflected to different extents and/or of light absorbed to different extents. This can involve particularly the light that comes essentially from the corresponding spatial angle. In other words: it may also be the light from the lamps of another road user to whom the graphical message is displayed. The light source of the other road user provides the light that is required for the display, this being achieved by reflection, in particular. Alternatively, it is possible to use other technologies, particularly laser technologies.

In a further development, the graphical message contains an information item, particularly presented as an image sequence, that contains at least: a call for action for another road user and/or a prior announcement of an action of its own or of a possible intention and/or an information notification for another road user.

The content of the graphical messages may be as follows, for example: invitation to change lane; prior announcements about the intention of the vehicle; speed indications; special warning sign with explanation of the reason for warning; notification of a conspicuous feature of the neighboring vehicle e.g. text "light?"; this allows e.g. a piece of information "baby on board" to appear through an otherwise darkened surface only if, and only in a particular direction, another vehicle is approaching or overtaking too quickly from this direction.

The method can also be applied even when the vehicle is at a standstill and the data bus is asleep. By way of example, salutations can be output in the direction of the radio key during locking/opening. A parked vehicle would also be better protected against possible jostling, e.g. when it were to display a parked sign or another situation-dependent graphical message in the direction of other vehicles.

In a further development, the content and/or the time sequence of the graphical message is dependent on the automatically ascertained visibility of a road user for the driver of the vehicle, the visibility being ascertained by taking account of one of the following parameters: setting of mirror positions and/or of the camera systems in the vehicle; at least partial concealment of the road user, particularly behind the pillars of the vehicle and/or behind further objects in the surroundings of the vehicle.

In another further development, the spatial angle and/or the content of the graphical message is determined on the basis of the driver condition captured using means in the vehicle and/or on the basis of a driver alertness and/or a driver perspective.

In another further development, the graphical message is displayed in three dimensions at least from one spatial angle.

In a variant, the graphical message is visible only at a particular range of distance that is indicated at least from one direction.

Hence, the graphical message is depicted sharply only at a particular range of distance of/up to e.g. 10 meters, 20 meters, 50 meters from the vehicle. At other ranges of distance, the graphical message can appear only in a substantially more reduced form, for example. In particular, a graphical message can contain a structure of high and low spatial frequencies that is such that it is perceived as substantially different graphical messages according to the observation distance. A similar effect on the observer is known in a completely different context, e.g. from some paintings by Salvador Dali. These reveal different contents depending on the observation distance.

Advantageously, this can be achieved with means of refraction, particularly of focusing. The loss of sharpness means that this is no longer visible to the full extent outside these ranges and hence the graphics lose or alter at least a substantial portion of the information.

There may be provision for interaction with the user. This interaction may also be in a form such that the direction in which a graphical message is intended to be displayed can be chosen by the user, particularly from an automatically generated preselection. In a development of this method, the user can even select individual road users for whom the advice is intended to be displayed. This can be accomplished by use of a screen, for example, that presents at least schematically depicted vehicle surroundings and/or a vehicle, so that the user can use a rotary knob or can use the touch screen function of the screen or can use gesture control, for example, to select one or more graphical messages to be displayed that are intended to be displayed particularly in one particular direction relative to the ego vehicle or explicitly in the direction of a particular lane or a particular road user.

In another aspect, an apparatus for direction-adaptive signaling, particularly by a vehicle, includes: a display that is set up to display a graphical message to the outside so as to be visible essentially only from one spatial angle and that is set up to alter an angle parameter of the spatial angle during display of the graphical message; and an electronic processing unit; wherein the apparatus is set up to carry out one of the methods presented above. The electronic processing unit may be a microprocessor, a computer or circuits designed specifically for the present purpose. The application of the method to a motor vehicle is also advantageous because modern motor vehicles have the necessary infrastructure for implementing the method and the economic benefit of the variant embodiments described here in road traffic is particularly great.

The disclosure also relates to a computation unit for carrying out one of the methods disclosed above and also the vehicle in which the relevant method is carried out. It is also possible for a computer program, a computer program product having a data storage medium with program code and/or an executable program to be provided that is designed to perform one of the methods described when the program code or the executable program is executed on a computation unit of appropriate design. The disclosure likewise relates to a product that is fitted into the vehicle, or mounted on the vehicle, retrospectively and particularly uses the vehicle infrastructure (power supply, data, signals) and in so doing carries out one of the methods described above.

In an advantageous refinement of the method, the display apparatus is mounted on the clothing of a motorcyclist or is designed as part of this clothing. The presentation of the graphical messages also takes account of the relative position of the motorcyclist on the vehicle. Hence, the method can ensure optimum operation for the methods described above even in the event of movements by the motorcyclist on his vehicle that are captured by sensor.

Other objects, advantages and novel features of the present invention will become apparent from the following detailed description of one or more preferred embodiments when considered in conjunction with the accompanying drawings.

BRIEF DESCRIPTION OF THE DRAWINGS

Reference symbols that are the same relate to corresponding elements throughout the figures.

DETAILED DESCRIPTION OF THE DRAWINGS

Figure 1:
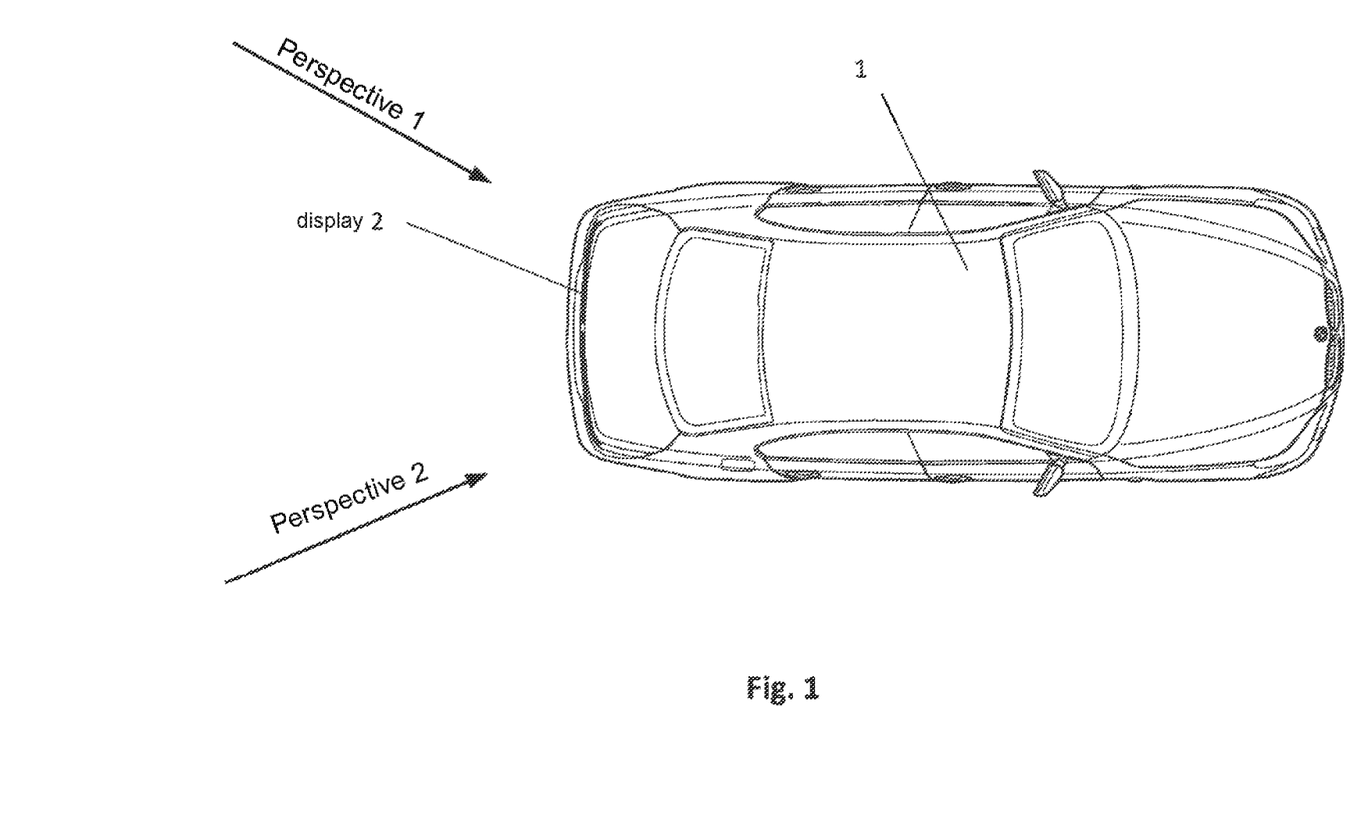
FIG. 1 schematically shows a vehicle with an apparatus for direction-adaptive signaling.

FIG. 1 schematically shows a vehicle 1 with a display 2 that is arranged at the rear of the vehicle 1 and that is set up to display a graphical message to the outside so as to be visible essentially only from one spatial angle. By way of example, the display 2 can display a graphical message at a first spatial angle that contains perspective 1 but not perspective 2. If another road user looks at the display 2 from perspective 1, he can see the graphical message. If the road user looks at the display 2 from perspective 2, he cannot perceive a graphical message.

Figure 2:
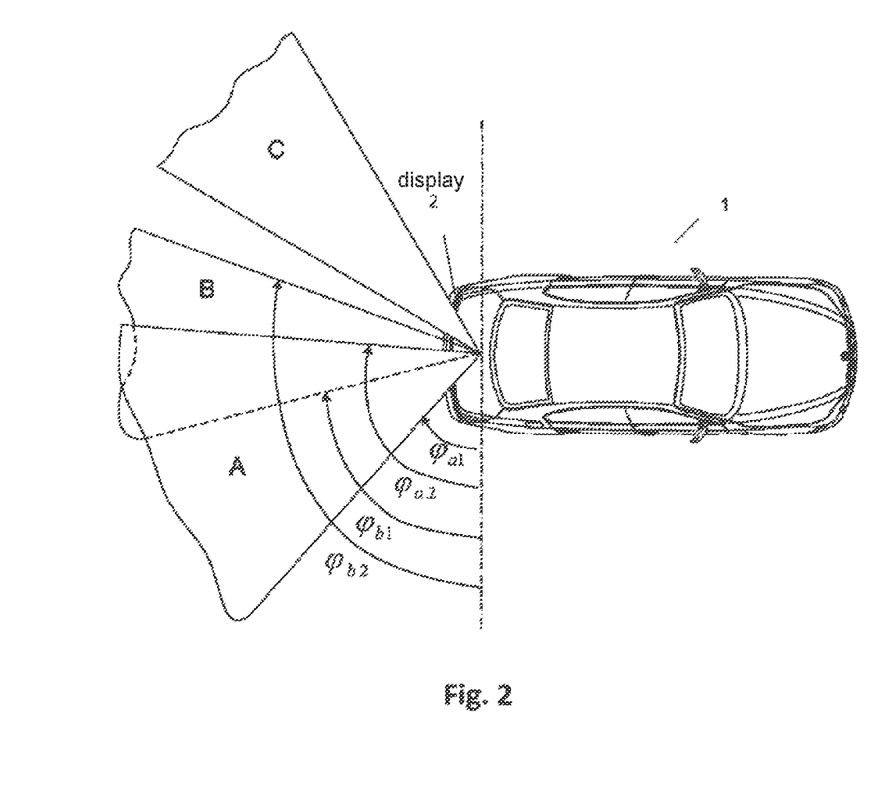
FIG. 2 schematically shows a vehicle with an apparatus for direction-adaptive signaling according to an exemplary embodiment.
Figure 3A:
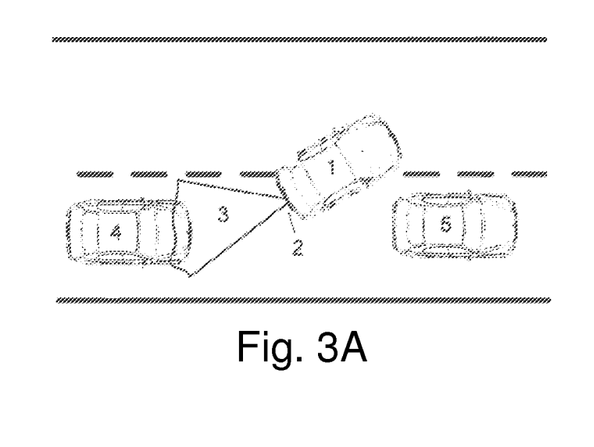
FIGS. 3A to 3D schematically show a vehicle in four different successive phases of a maneuver according to an exemplary embodiment.
Figure 3B:
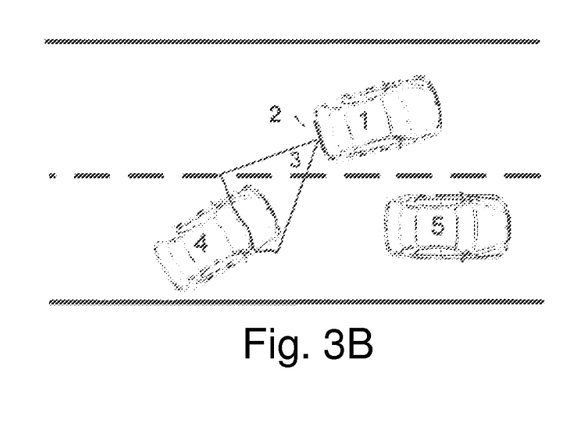
Figure 3C:
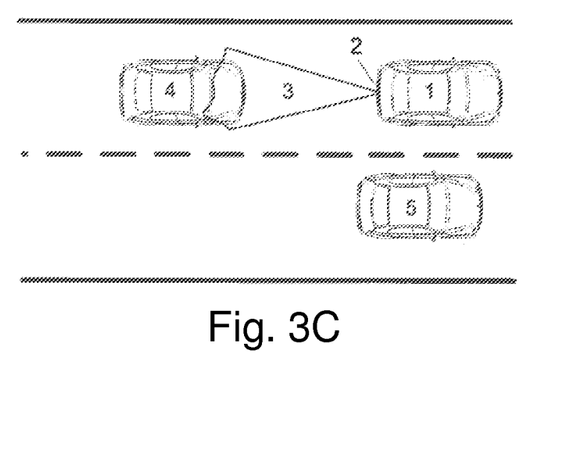
Figure 3D:
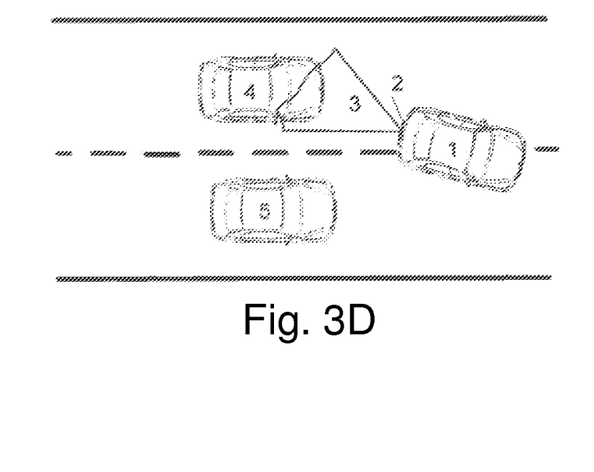

FIG. 2 schematically shows the vehicle 1 with a display 2 that is arranged at the rear of the vehicle 1. The display 2 is set up to display a graphical message to the outside so as to be visible essentially only from one spatial angle. In this case, the display 2 displays the same graphical message, for example a symbol or text, in succession first at the spatial angle "A", then at the spatial angle "B" and finally at the spatial angle "C". The spatial angle "A" extends from the angle parameter $\varphi_{a1}$ to $\varphi_{a2}$. The spatial angle "B" extends from the angle parameter $\varphi_{b1}$ to $\varphi_{b2}$. For the spatial angle "C", the range of the angle parameters is not explicitly indicated as an aid to illustration in this example.

The vehicle 1 uses capture systems, such as cameras, lidar or radar, to determine the position of the vehicle travelling past the rear of the vehicle vertically from bottom to top (not shown). This position is used to calculate the angle at which the driver of the passing vehicle can look at the display 2. This angle is used to determine a spatial angle (in this case: spatial angles "A" to "C") that is chosen around the determined angle of vision or the perspective of the passing driver. The spatial angle can be chosen such that a certain safety margin is included in the calculation to compensate for measurement errors or other inaccuracies. FIG. 2 shows three spatial angles. Provision may also be made for the spatial angle to be adjusted continuously or in substantially smaller steps.

FIGS. 3A to 3D schematically show a vehicle 1 in four different successive phases of a maneuver, in this case an overtaking maneuver, with a display 2 that is arranged at the rear of the vehicle 1 and that is set up to display a graphical message to the outside so as to be visible essentially only from a spatial angle 3. The display is embodied such that the spatial angle from which the graphical message is visible alters on the basis of the vehicle trajectory. This results in the advantage that the vehicle 4 that follows or could follow the vehicle in the event of the overtaking maneuver can see the graphical message that is intended specifically for this following vehicle.

In this example, the vehicle 4 does not need to be captured by use of object recognition. In this case, the spatial angle at which the graphical message is rendered visible is calculated as 0.5 to 60 seconds from a plurality of vehicle positions from the recent past that have been captured using GPS and/or by means of wheel sensors. This also takes account of the respective vehicle orientation at various instants.

Hence, a graphical message that is intended for a vehicle that possibly follows the vehicle 1 during its overtaking operation is always displayed such that it is visible from the perspective of this following vehicle.

In this case, the graphical message contains a traffic situation ahead of the vehicle 1 that is automatically captured by sensor, for example, and shown schematically. Such a traffic situation assists the driver of the vehicle 4 to see the objects that he may not be able to see and to correctly assess the danger when following the vehicle 1.

As a result of the spatial angle from which the displayed message is visible being limited and taken along, other road users are not distracted or unsettled by the displayed message. At the same time, however, the message can be perceived and processed by the passing driver.

The graphical messages can be presented three-dimensionally per se. From the perspective of the observer, they can at least to some extent appear as being inside or outside the physical vehicle surface.

An advantage of a graphical message that is outside the vehicle surface at least to some extent in the perception of the observer is also that:

the perceived dimensions of the vehicle appear larger in one or more directions when a graphical message is represented, without the vehicle needing to be of such a physical size. This also decreases the safety distance perceived by the observer, particularly while a graphical message is being presented, so that said observer will brake earlier or take better evasive action, for example, and has a higher probability of avoiding a collision with the vehicle.

An advantage of a graphical message that is at least to some extent inside the vehicle surface in the perception of the observer is also that:

there are better designs option for presenting a difference in the perceived depth for presenting the information; and there are better design options for presenting various forms and/or the design of the graphical message as such.

In the case of a graphical message that is perceived in three dimensions, one portion of the display can appear inside the physical surface while another portion appears outside the physical surface of the vehicle. When an inherently two-dimensional graphical message, but one that is arranged in three dimensions, is presented, there is the possibility of presenting said message at an optimum angle in relation to the perspective. This variant can also be implemented with little complexity.

The disclosure also relates to a computation unit for carrying out one of the methods presented above and to the vehicle in which the relevant method is carried out. It is also possible to provide a computer program, a computer program product with a data storage medium having program code and/or having an executable program that is designed to perform the method described when the program code or the executable program is executed on a computation unit of appropriate design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for direction-adapted signaling by a vehicle, the method comprising the acts of:
    displaying a graphical message via a display, wherein the display deflects light from actively illuminated pixel elements forming the graphical message such that the displayed graphical message is visible from outside the vehicle only from one spatial angle that includes an area significantly removed from any blind spot of the vehicle;
    sensing, via a sensor, the position of a viewer with respect to the vehicle; and
    altering at least one angle parameter of the one spatial angle while the graphical message is displayed, such that the viewer is positioned within the spatial angle, wherein the area of the spatial angle is defined by the at least one angle parameter, and wherein the altering of the at least one angle parameter of the spatial angle is based on two or more recent positions of the vehicle.

2. The method according to claim 1, wherein the act of altering the at least one angle parameter of the spatial angle is carried out based on one or more of: a speed of the vehicle, a present driving situation, or an execution of a defined driving maneuver.

3. The method according to claim 1, wherein the act of altering the at least one angle parameter of the spatial angle is carried out based on an actual or predicted movement by at least one road user, wherein the spatial angle is matched to a position of the road user or follows a movement of the road user.

4. The method according to claim 1, wherein the spatial angle is determined based on an assumed position, an executed maneuver, or a movement trajectory of the vehicle that occurred within less than 30 seconds of the determination.

5. The method according claim 1, further comprising the acts of:
    displaying a second graphical message from a same vehicle region of the displayed graphical message; and
    wherein each graphical message displayed has an associated spatial angle from which a respective graphical message is visible but the other graphical message is not, and
    wherein the associated spatial angles differ at least in an angle parameter.

6. The method according to claim 5, wherein the spatial angles differ in a pitch component.

7. The method according to claim 1, wherein the graphical message comprises a symbol, text, an object contour, or an area filled with a texture.

8. The method according to claim 1, wherein the act of displaying the graphical message is carried out using a display comprising one or more of microprisms, microlenses, or lenticular optical components.

9. The method according to claim 1, wherein the act of displaying the graphical message comprises a local altering of reflection properties, absorption properties, or interference properties of incident light from a direction of the spatial angle.

10. The method according to claim 1, wherein the graphical message comprises an image sequence containing one or more of a call for action by another road user, a prior announcement of the vehicle's own action or intention to act, or an information notification for another road user.

11. The method according to claim 1, wherein the act of displaying the graphical message comprises displaying content or a time sequence of the graphical message dependent on an automatically ascertained visibility of a road user for a driver of the vehicle, wherein
the visibility is determined by taking account of one of the following parameters: setting of mirror positions or camera systems in the vehicle; and
an at least partial concealment of the road user behind pillars of the vehicle or behind other objects in surroundings of the vehicle.

12. The method according to claim 1, wherein the spatial angle is determined based on: a driver condition captured via sensors in the vehicle, a driver alertness, or a driver perspective.

13. The method according to claim 1, wherein content of the graphical message is determined based on: a driver condition captured via sensors in the vehicle, a driver alertness, or a driver perspective.

14. The method according to claim 1, wherein the act of displaying the graphical message is carried out by displaying the graphical message 3-dimensionally.

15. The method according to claim 1, wherein the act of displaying the graphical message is carried out by making the graphical message visible only at a particular distance range.

16. An apparatus for direction-adapted signaling by a vehicle, comprising:
a display configured to display a graphical message outside the vehicle via deflecting light from actively illuminated pixel elements such that the displayed graphical message is visible only from one spatial angle that includes an area significantly removed from any blind spot of the vehicle, the display being also configured to achieve an altered angle parameter of the one spatial angle during display of the graphical message;
a sensor configured to sense the position of a viewer relative to the vehicle; and
an electronic processing unit configured to execute program code that:
causes the display to display the graphical message outside the vehicle so as to be visible only from the one spatial angle; and
causes the display to alter at least one angle parameter of the one spatial angle so as to achieve the altered angle parameter while the graphical message is displayed, such that the viewer is positioned within the spatial angle, wherein the area of the spatial angle is defined by the at least one angle parameter, and wherein the altering of the at least one angle parameter of the spatial angle is based on two or more recent positions of the vehicle.

17. A vehicle comprising the apparatus according to claim 16.

18. The method according to claim 1, wherein the at least one angle parameter includes: a pitch component and a yaw component, and wherein the altering is of both the pitch and yaw components.

19. The method according to claim 1, wherein the altering of the at least one angle parameter of the spatial angle is continuous rather than in discrete steps.

* * * * *